United States Patent

Kaul et al.

[11] Patent Number: 6,132,894
[45] Date of Patent: Oct. 17, 2000

[54] 1:2 IRON AZO-DYESTUFF COMPLEXES

[75] Inventors: Bansi Lal Kaul, Biel-Benken, Switzerland; Dominique Pflieger, Tagsdorf, France

[73] Assignee: Clariant Finance (BVI) Limited, Tortola, Virgin Islands (Br.)

[21] Appl. No.: 09/230,909

[22] PCT Filed: Aug. 4, 1997

[86] PCT No.: PCT/IB97/00958

§ 371 Date: Feb. 3, 1999

§ 102(e) Date: Feb. 3, 1999

[87] PCT Pub. No.: WO98/05717

PCT Pub. Date: Feb. 12, 1998

[30] Foreign Application Priority Data

Aug. 6, 1996 [GB] United Kingdom .................. 9616555

[51] Int. Cl.[7] .............................. C09D 7/00; C09B 45/12; C09B 67/22; C09B 69/04
[52] U.S. Cl. .................................. 428/704; 8/685; 8/639; 534/684; 534/688; 534/692; 534/713; 534/723; 534/693; 534/696
[58] Field of Search ....................... 8/685, 639; 534/684, 534/688, 692, 713, 723, 693, 696; 428/704

[56] References Cited

U.S. PATENT DOCUMENTS 5,376,151  12/1994  Freeman et al. ............................ 8/685

FOREIGN PATENT DOCUMENTS 62-129358  6/1987  Japan .
7-97530   4/1995  Japan .

OTHER PUBLICATIONS

Chemical Abstracts, vol. 123, Abstract No. 202030 & JP070097530, Abstract and Compound RN 167768–55–0 Apr. 1995.

Chemical Abstracts, vol. 108, Abstract No. 29373 & JP620129358, Abstract and Compound RN 112210–23–8 & 111920–63–9 Jun. 1987.

*Primary Examiner*—Margaret Einsmann
*Attorney, Agent, or Firm*—Susan S. Jackson; Scott E. Hanf

[57] ABSTRACT

A compound of formula (I) or a mixture thereof

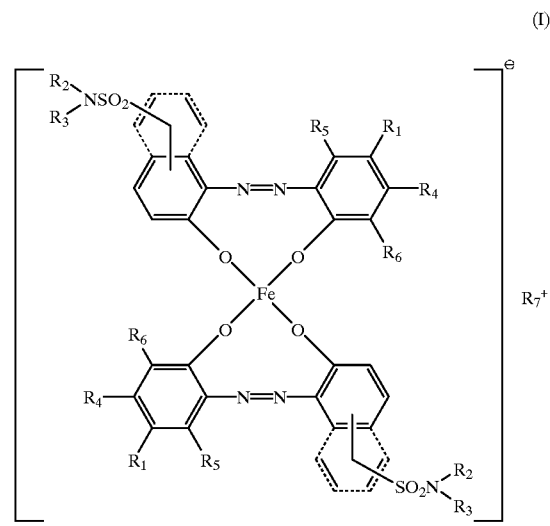

The compounds are useful as solvent dyestuffs and exhibit high solubility in alcoholic solvents, e.g. ethanol.

6 Claims, No Drawings

1:2 IRON AZO-DYESTUFF COMPLEXES

BACKGROUND OF THE INVENTION

Solvent dyes are used for a great variety of purposes although principally they are used in the mass coloration of plastics materials or in various lacquers and varnishes.

While solvent dyes may, in some cases, be incorporated directly into the product to be colored, as their name suggests, they are usually applied from solutions in organic solvents or mixtures of such solvents.

It has been normal practice to dissolve solvent dyestuffs in solvents such as ethers, esters, ketones, chlorinated hydrocarbons and alcoholic solvents e.g. ethanol. Of these solvents, the alcoholic solvents have become increasingly important because of environmental considerations. Unfortunately, however, dyestuffs having desirably high solubility in alcoholic solvents have not until now been available. There is a need for solvent dyestuffs which are highly soluble in alcoholic solvents, in particular ethanol.

SUMMARY OF THE INVENTION

This invention is concerned with 1:2 iron azo-dyestuff complexes. It has now been found that certain new 1:2 iron azo-dyestuff complexes exhibit desirably high solibilities in ethanol The invention provides in one of its aspects a compound of the formula (I)

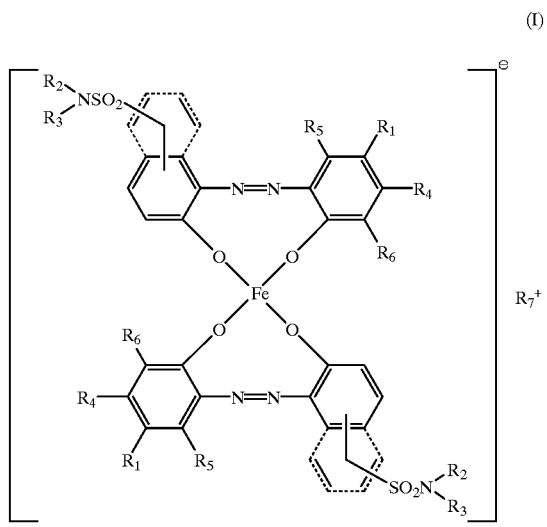

or a mixture thereof
wherein $R_1$ is hydrogen,

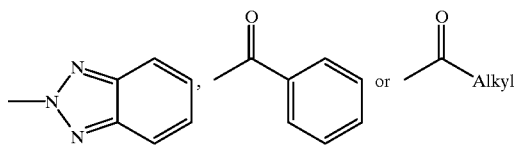

$R_2$ and $R_3$ independently of each other are hydrogen, alkyl, alkoxyalkyl, cycloalkyl and aryl
$R_4$ is H or OH
$R_5$ is hydrogen, alkyl, alkoxyalkyl and cycloalkyl
$R_1$ and $R_5$ together with the ring to which they are attached form a naphthyl group,
$R_6$ is hydrogen or a group

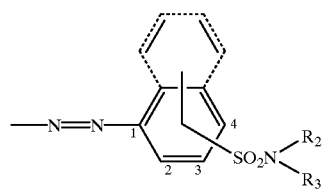

$R_7^+$ is a protoncled aliphatic or cycloaliphatic amine with the proviso that
(i) when $R_1$ and $R_5$ together with the ring to which they are attached form a naphthyl group then $R_4$ is hydrogen and $R_6$ is hydrogen and
(ii) $R_4$ is OH when
$R_1$ is hydrogen,

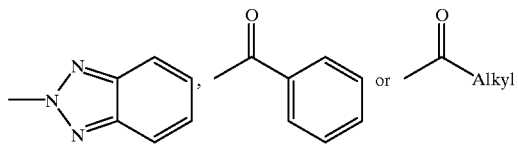

$R_5$ is hydrogen, alkyl, alkoxyalkyl and cycloalkyl.

DESCRIPTION OF THE PREFERRED EMBODIMENTS

Preferred alkyl groups are $C_{1-4}$ alkyl, which may be linear or branched, e.g. methyl, ethyl or n-propyl, iso-propyl and n- and t-butyl. Preferred alkoxyalkyl groups have 1 to 8 carbon atoms and may be, for example, methoxyalkyl or ethoxyalkyl, more particularly methoxypropyl.

Preferred cycloalkyl groups are those forming a 5 or 6 membered ring.

As aryl groups one can mention the phenyl group or fused rings, for example naphthyl groups. Aryl groups may be unsubstituted or they may be substituted with substituents selected from halogen (preferably Cl and Br), OH, $C_{1-4}$alkyl, $C_{1-4}$alkoxy, cyano, —$NO_2$, $C_{1-4}$alkylcarbonyl, SCN, $C_{1-4}$alkoxycarbonyl, benzoyl, phenoxycarbonyl, $C_{1-4}$alkylcarbonyloxy, aminocarbonyl, mono($C_{1-4}$alkyl) aminocarbonyl, di($C_{1-4}$alkyl)aminocarbonyl, mono($C_{1-4}$alkoxy-$C_{2-4}$alkyl)-aminocarbonyl, di($C_{1-4}$alkoxy-$C_{2-4}$alkyl)aminocarbonyl, aminosulphonyl, mono($C_{1-4}$alkyl)-aminosulphonyl, di($C_{1-4}$alkyl)aminosulphonyl, mono($C_{1-4}$alkoxy-$C_{2-4}$alkyl)amino sulphonyl, di($C_{1-4}$alkoxy $C_{2-4}$alkyl) amino sulphonyl and phenylaminosulphonyl.

The group $R_7$+ may be selected from ammonium, mono $C_{5-20}$alkyl ammonium, di($C_{5-20}$alkyl)-ammonium, tri($C_{5-20}$alkyl)ammonium, preferably mono $C_{8-16}$alkyl ammonium, di($C_{8-16}$alkyl)-ammonium, tri($C_{8-16}$alkyl)ammonium and more preferably 4-amino-2,2,6,6-tetra-alkylpiperidinium, 4-hydroxy-2,2,6,6-tetraalkylpiperidinium and 4-keto-2,2,6,6-tetraalkyl-piperidinium. Particularly preferred groups $R_7^+$ are mono-octyl ammonium, 2-ethylhexyl-ammonium, 4-amino-2,2,6,6-tetramethyl-piperidinium, 4-hydroxy-2,2,6,6-tetramethyl-piperidinium or 4-keto-2,2,6,6-tetramethylpiperidinium.

In a preferred compound according to the invention the sulphamoyl group on a phenyl ring is in the 4- or 5-position whereas the sulfamoyl group on a naphthyl ring is in the 4- or 6-position.

More preferred compounds according to the invention have the following formulae

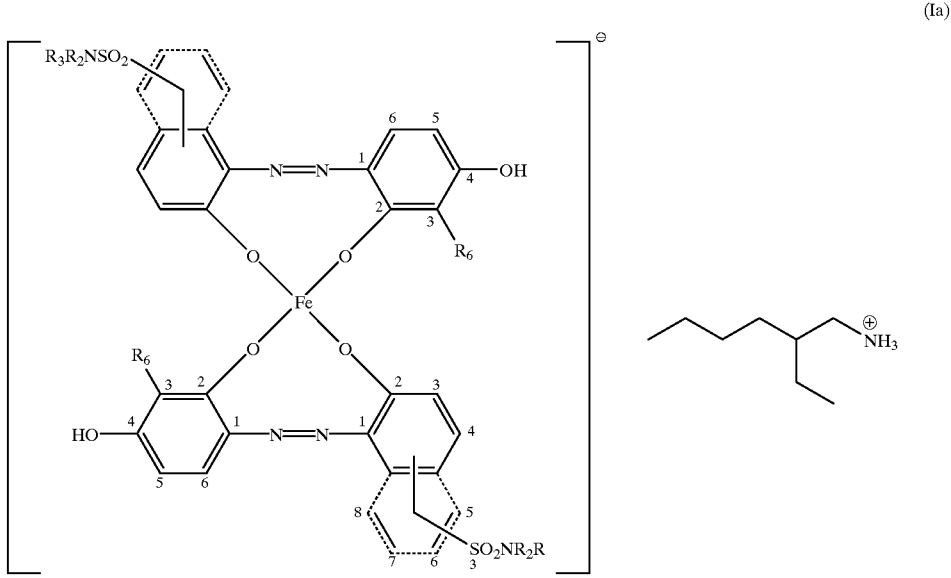

(Ia)

or mixtures thereof wherein $R_2$, $R_3$ and $R_6$ are as hereinabove defined and the group —$SO_2NR_2R_3$ is in the 4- or 5-position when the ring is a phenyl ring and in the 4- or 6-position when the ring is a naphthyl ring.

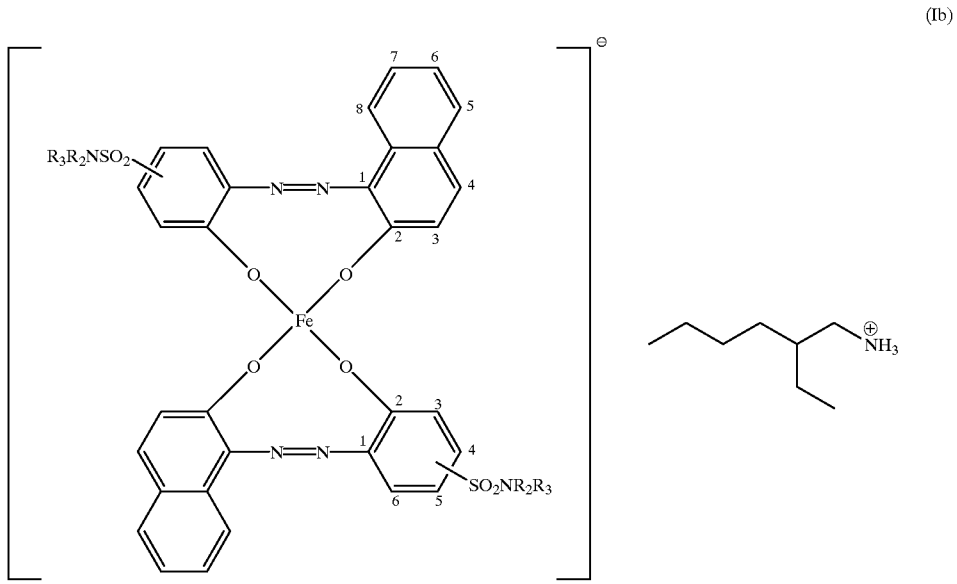

(Ib)

wherein $R_3$ is methoxypropyl and the group —$SO_2NR_2R_3$ is in the 4- or 5-position, more preferably the 5-position.

Compounds according to the formula (I) are obtained as mixtures of symmetric and asymmetric compounds. By "symmetric" is meant compounds wherein both of the groups $R_6$ are hydrogen or both are azo-sulphamoyl phenyl whereas by "asymmetric" is meant those compounds wherein the significances of $R_6$ are at the same time different.

It follows from the preceding paragraph that those compounds wherein $R_1$ and $R_5$ together with the ring to which they are attached form a naphthyl group are formed not as a mixture of symmetric and asymmetric compounds but as the symmetric compound only.

The skilled person will understand that the relative amount of symmetric and asymmetric compound formed in a mixture will depend upon a number of factors, for example the proportion in which the reactants, that is the diazotised amine of formula (II) and compound of formula III, are employed; and the reaction conditions, e.g. the rate and sequence of addition of the reactants and temperature.

A compound of formula (I) can be prepared by known method for producing 1:2 metal dyestuff complexes, for example by coupling a diazotised amine of formula (II)

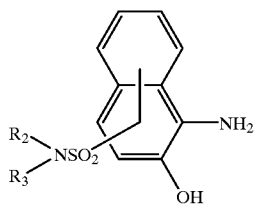

with a compound of formula (III),

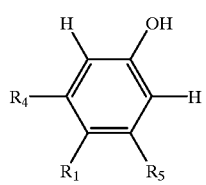

with subsequent or contemporaneous metallisation with an iron donating compound, and introduction of the cation.

Coupling reactions are known in the art and may be carried out under basic conditions, suitably in an aqueous medium at pH values of at least 7.5, principally in the range of 8 to 14, and under mild temperatures, preferably in the range of −5° C. to +25° C., more preferably 0 to 20° C. The pH conditions may be adjusted using alkali metal hydroxides, carbonates, ammonia or amines.

Metallisation of monoazo or disazo compounds may be carried out by employing conventional iron compounds, for example ferrous sulphate, ferric sulphate, ferrous nitrate, ferric nitrate or iron trichloride, suitably in an aqueous medium advantageously at a pH of from 3.5 to 6.5, preferably 4 to 6, with heating.

Metallisation is preferably carried out at temperatures in the range of 40° C. up to reflux temperature, more preferably 60° C. to 100° C.

The dyestuff so formed can be isolated from the reaction mixture in a conventional manner i.e., by salting out and filtration.

The compounds of formula I are usefully employed as dyes (especially for dyeing in the mass) for plastics material including solvent-free and solvent containing plastics masses and solvent-free or solvent containing plastics resins. They are used in finishes based on oil or water based paints, in various lacquers, in wood stains, in spin dyeing of viscose or cellulose acetate, for dyeing of natural or synthetic polyamides, polyester, polyethylene, polystyrene, polyvinylchloride, rubber and synthetic leather. The compounds can be used for printing of graphic material, for dyeing of paper masses, for coating of textile and leather or for printing uses.

The compounds of formula I have exceptionally high solubility in ecologically acceptable solvents, e.g. ethanol in which solvent solubility may be as high as 400 to 500 g/l. This has the benefit that for a given quantity of dyestuff, less solvent needs to be employed in a given dyeing operation. Furthermore, the use of iron as the metal instead of heavy metals such as copper, cobalt or chromium means that the new compounds can be used in an ecologically beneficial way to dye or print substrates for example aluminium foils used for packaging. This enables the aluminium to be recycled easily. Therefore the compounds are useful in reducing waste that results from recycling and for reducing the amount of harmful products.

Dyeings with the new compounds have good properties generally, for example good heat stability properties, good light and weathering properties, good chemical resistance, good migration properties, low blooming, good overcoating properties, good fastness in solvent properties, good dyeing strength and good application properties (e.g. flocculation fastness).

Dyeing, printing and padding can be carried out with the compounds on substrates by known methods.

There now follows a series of examples which illustrate the invention.

EXAMPLE 1 a) 26.0 parts of 2-amino-4-(3'-methoxypropylamino-sulphonyl) phenol are stirred into a mixture of 200 parts of water and 70 parts of 30% HCl. After the addition of 50 parts of ice, the amine is diazotized by the addition of 26.2 parts by volume of 4N NaNO$_2$ solution. The resulting suspension is stirred for 3 hours at 0° C. and then slowly poured into a solution of 13.7 parts of β-naphthol in 190 parts of water and 9.5 parts of 30% NaOH. By the simultaneous addition of a further 70 parts of 30% NaOH, the pH is brought to 9.5–10. The resulting mixture is then stirred at room temperature for 8 hours and brought to pH 1.5 by the addition of 30% HCl. The resulting precipitate is filtered, washed with 4000 parts of water and dried.

b) 500 parts of the monoazo dyestuff of part a) above are suspended in a mixture of 500 parts of water, 30 parts of dipropylene glycol monomethyl ether and 15.5 parts of sodium carbonate. After warming at 96° C. for over 1 hour, a solution of 16.4 parts of iron chloride hexanhydrate in 50 parts of water is slowly added, whereupon a voluminous suspension of the iron complex results. The temperature is allowed to fall to 45° C. over 2 hours (while stirring well) and the suspension is slowly reacted with a solution of 7.8 parts of 2-ethyl-hexylamine in 100 parts of water and 10 parts of 30% HCl. The resulting precipitate is adjusted to pH 6.5 by the addition of about 2 parts of HCl. The mixture is stirred a further hour at room temperature, filtered and the residue is washed salt-free and then dried. A compound of formula

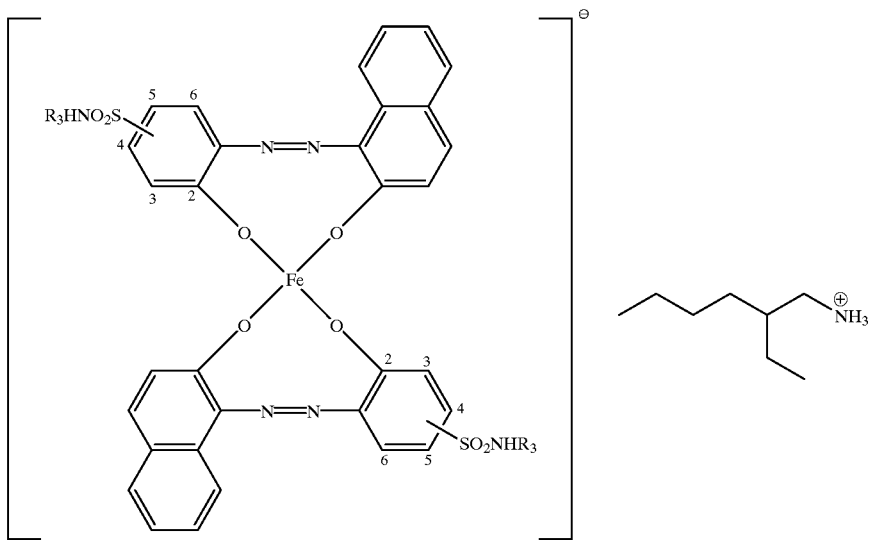

in which $R_3$ is methoxypropyl and the sulphamoyl groups are both in the 5-position is obtained.

EXAMPLE 2 a) 40.4 parts of 2-amino-5-(4-methylamino-sulphonyl) phenol are stirred into a mixture of 200 parts of water and 70 parts of 30% HCl. After the addition of 50 parts of ice, the amine is diazotized by the addition of 53 parts by volume of 4N $NaNO_2$ solution. The resulting suspension is stirred for 3 hours at 0° C. A solution of 22.5 parts of resorcinol in 40 parts of water and 10.6 parts of sodium carbonate is then slowly added. The resulting mixture is then stirred at room temperature for 8 hours and brought to pH 1.5 by the addition of 30% HCl. The resulting precipitate is filtered, washed with 4000 parts of water and dried.

Finally the resulting dyestuff, analogously to the process of Example 1 is reacted with sodium carbonate iron chloride and 2-ethyl-hexylamine to a 1:2 iron-dyestuff complex of formula as a mixture of symmetrical and unsymmetrical isomers

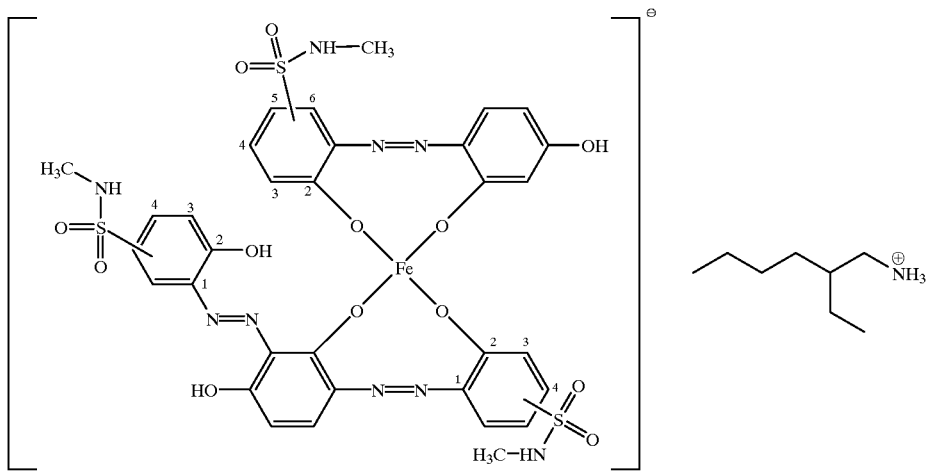

The sulphamoyl groups are in the 4-position.

The dyestuff colors nitrocellulose lacquers a dark brown color and yields high solubilities in ethanol (up to 400 g/l).

APPLICATION EXAMPLE 5 parts of the dyestuff of Example 1 in a Dissolver apparatus are stirred into 95 parts of a nitrocellulose lacquer prepared from:

18.8% of Nitrocellulose A15 (in the form of white flocs wetted with 35% isopropanol)
6.3% of an acrylic acid butyl ester polymer, a softener resin (Acronal 4F from BASF)
3.3% of diphenyloctylphosphate, a softener (Santiciser 141 from Monsanto)

The resulting dye dyes nitro cellulose lacquers a reddish brown shade and has a solubility in ethanol of about 100 g/l.

-continued

| |
|---|
| 10.0% of methoxy propanol (Dowanol PM from Dow Chemical) |
| 10.0% ethoxypropanol |
| 41.6% ethanol, and |
| 10.0% ethyl acetate. |

This is dissolved overnight in a rolling block. The solubility is very good.

With a 25 mm blade, a wet film of this lacquer composition is placed on aluminium foil and the lacquer is dried for 5 hours at 130° C. A brownish red lacquer coating results with good light and migration fastness properties.

The Application Example is repeated with the mixture obtained in Example 2. A brownish-red lacquer is obtained exhibiting good light and migration fastness properties.

What is claimed is:

1. A compound according to the formula (I)

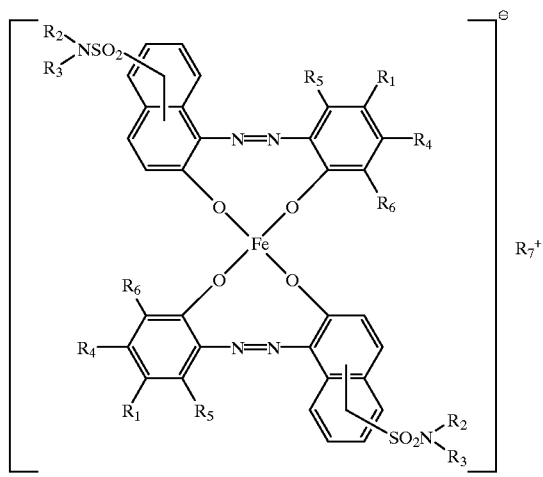

(I)

or a mixture thereof
wherein $R_1$ is hydrogen,

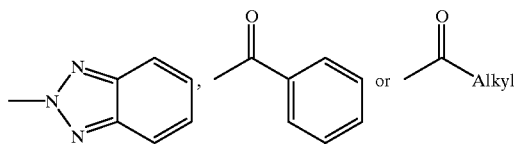

$R_2$ is hydrogen, alkyl, alkoxyalkyl, cycloalkyl or aryl and
$R_3$ is alkyl, alkoxyalkyl, cycloalkyl or aryl
$R_4$ is H or OH
$R_5$ is hydrogen, alkyl, alkoxyalkyl or cycloalkyl
or $R_1$ and $R_5$ together with the ring to which they are attached form a naphthyl group,
$R_6$ is hydrogen or a group

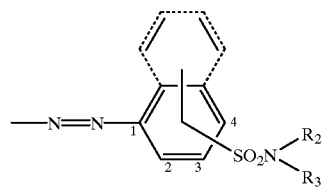

$R_7$ is a protonated aliphatic or cycloaliphatic amine or piperidinium with the proviso that
(i) when $R_1$ and $R_5$ together with the ring to which they are attached form a naphthyl group then $R_4$ is hydrogen and $R_6$ is hydrogen, and
(ii) $R_4$ is OH when $R_1$ is hydrogen,

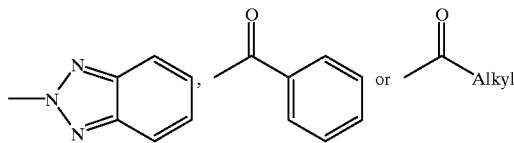

and $R_5$ is hydrogen, alkyl, alkoxyalkyl and cycloalkyl.

2. A compound or a mixture thereof according to claim 1, wherein $R_7^+$ is 2-ethyl-hexylamine.

3. A compound or a mixture thereof according to claim 1, wherein said compound or mixture is selected from the group consisting of

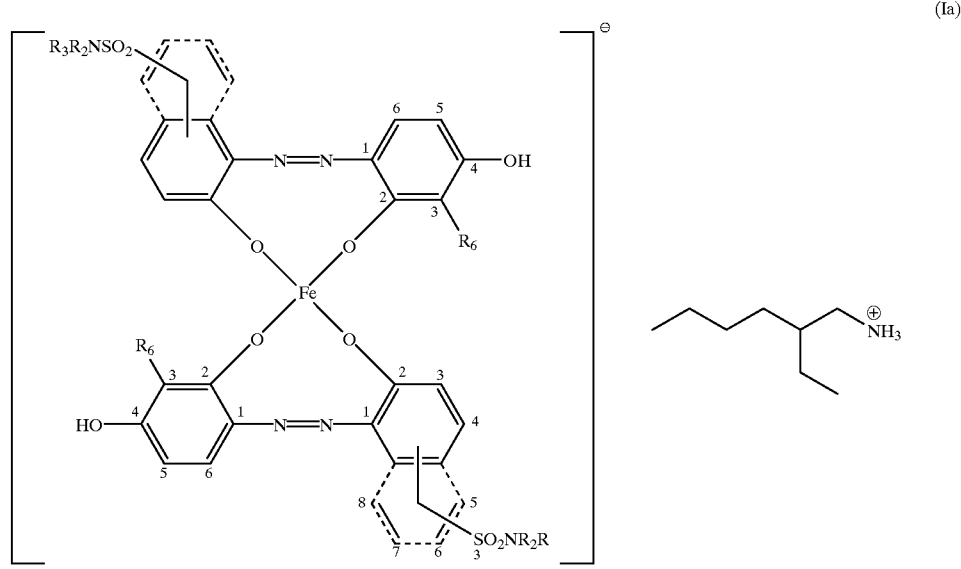

(Ia)

and

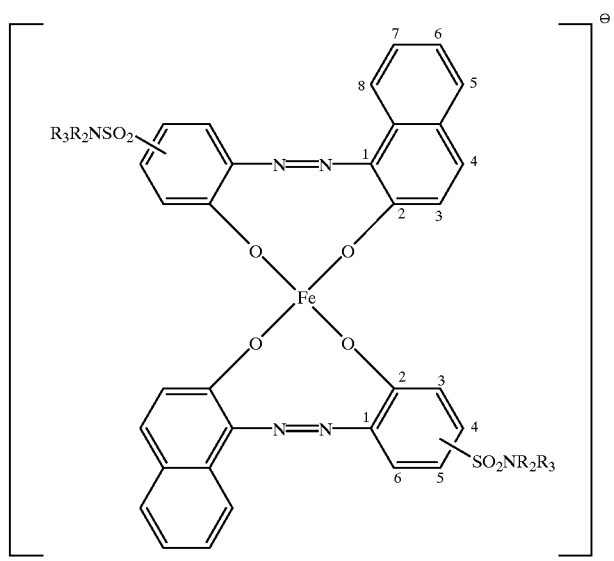

or a mixture thereof wherein

R₁ is hydrogen,

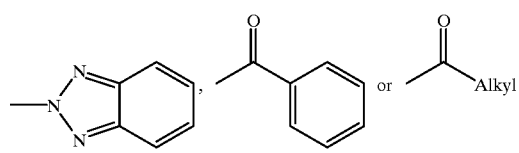

R₂ and R₃ independently of each other are hydrogen, alkyl, alkoxyalkyl, cycloalkyl and aryl R₄ is H or OH R₅ is hydrogen, alkyl, alkoxyalkyl and cycloalkyl 4. A process of forming a compound of the formula (I)

(I)

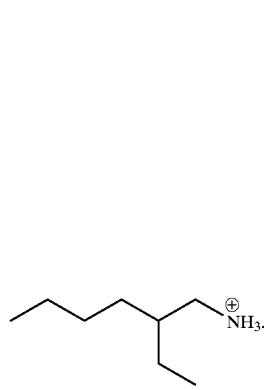

(Ib)

R₁ and R₅ together with the ring to which they are attached form a naphthyl group, R₆ is hydrogen or a group

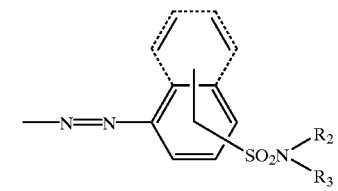

R₇ is a protonated aliphatic or cycloaliphatic amine and with the proviso that
(i) when R₁ and R₅ together with the ring to which they are attached form a naphthyl group then R₄ is hydrogen and R₆ is hydrogen and
(ii) R₄ is OH when R₁ is hydrogen

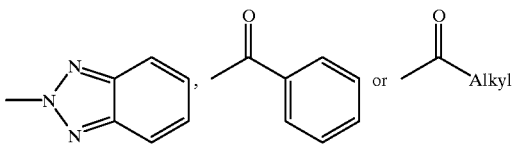

and R₅ is hydrogen, alkyl, alkoxyalkyl and cycloalkyl comprising the steps of reacting the diazotised amine of formula (II)

(II)

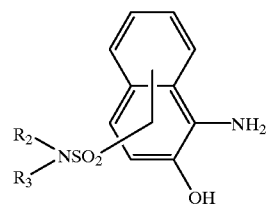

with a compound of formula (III),

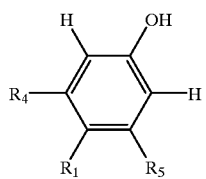

metallizing using an iron-donating compound and introducing the cation $R_7^+$.

5. A coated substrate comprising:

a) a substrate, and b) a compound of the formula (I)

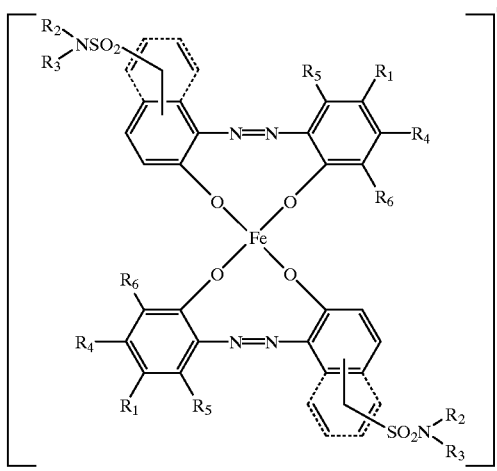

or a mixture thereof wherein $R_1$ is hydrogen,

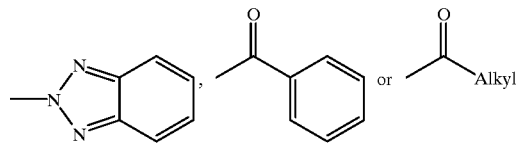

$R_2$ and $R_3$ independently of each other are hydrogen, alkyl, alkoxyalkyl, cycloalkyl or aryl $R_4$ is H or OH $R_5$ is hydrogen, alkyl, alkoxyalkyl or cycloalkyl $R_1$ and $R_5$ together with the ring to which they are attached form a naphthyl group, $R_6$ is hydrogen or a group

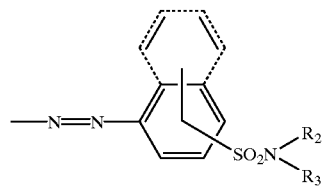

is a protonated aliphatic or cycloaphatic amine and with the proviso that (i) when $R_1$ and $R_5$ together with the ring to which they are attached form a naphthyl group then $R_4$ is hydrogen and $R_6$ is hydrogen and (ii) $R_4$ is OH when $R_1$ is hydrogen

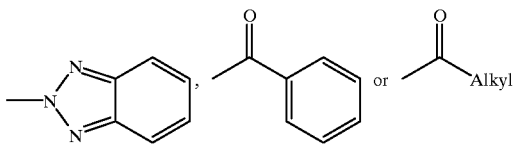

and $R_5$ is hydrogen, alkyl, alkoxyalkyl and cycloalkyl.

6. A modified lacquer comprising:

a) a lacquer, and b) a compound of the formula (I)

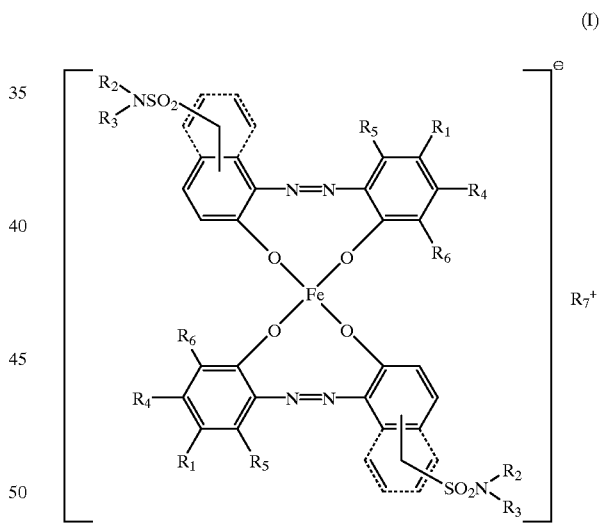

or a mixture thereof
wherein
$R_1$ is hydrogen,

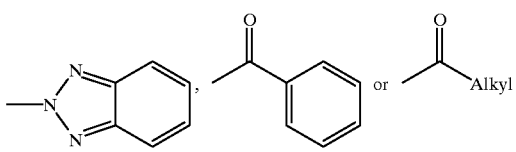

$R_2$ and $R_3$ independently of each other are hydrogen, alkyl, alkoxyalkyl, cycloalkyl or aryl $R_4$ is H or OH $R_5$ is hydrogen, alkyl, alkoxyalkyl or cycloalkyl, or $R_1$ and $R_5$ together with the ring to which they are attached form a naphthyl group, $R_6$ is hydrogen or a group

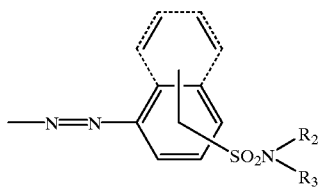

R is a protonated aliphatic or cycloaliphatic amine and with the proviso that (i) when $R_1$ and $R_5$ together with the ring to which they are attached form a naphthyl group then $R_4$ is hydrogen and $R_6$ is hydrogen and (ii) $R_4$ is OH when $R_1$ is hydrogen

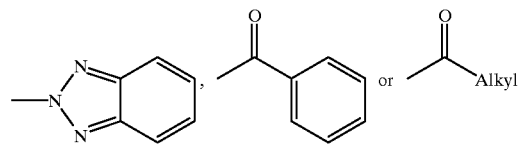

and $R_5$ is hydrogen, alkyl, alkoxyalkyl and cycloalkyl.

* * * * *

UNITED STATES PATENT AND TRADEMARK OFFICE
CERTIFICATE OF CORRECTION

PATENT NO. : 6,132,894
DATED : October 17, 2000
INVENTOR(S) : Bansi Lal Kaul and Dominique Pflieger It is certified that error appears in the above-identified patent and that said Letters Patent is hereby corrected as shown below:

Column 9,
Lines 21-40, please delete the compound of the formula (I) and replace with the following:

--

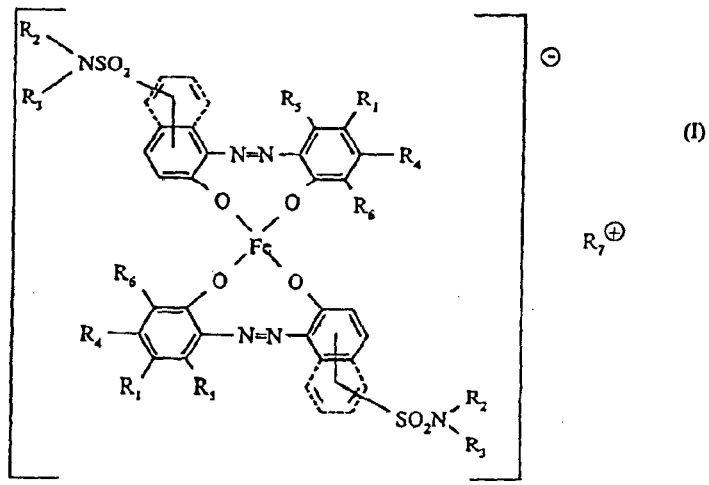

--.

Signed and Sealed this

Fourteenth Day of October, 2003

JAMES E. ROGAN
*Director of the United States Patent and Trademark Office*